Dec. 15, 1959    D. F. SWANSON ET AL    2,916,891
PREMATURE CYCLER FOR REFRIGERATION LOAD
Filed Aug. 9, 1956    2 Sheets-Sheet 1

INVENTOR
Donald F. Swanson
Wynn G. Winkler
BY Robert M. Dunning
ATTORNEY

United States Patent Office 2,916,891
Patented Dec. 15, 1959

2,916,891

PREMATURE CYCLER FOR REFRIGERATION LOAD

Donald F. Swanson and Wynn G. Winkler, St. Paul, Minn., assignors to Whirlpool Corporation, a corporation of Delaware Application August 9, 1956, Serial No. 603,084

12 Claims. (Cl. 62—161)

This invention relates to an improvement in premature cycler for refrigeration load and deals particularly with a means of accelerating the cooling of liquids in liquid cooling tanks.

During recent years, it has become common practice to cool liquid such as milk in refrigerated tanks, usually immediately after the milking process. These tanks usually comprise vats having rounded bottoms and made of stainless steel or other material which may be properly cleaned and sterilized. The tanks are usually provided with hinged or removable covers and are equipped with an agitator by means of which the liquid may be circulated through the tank so that the liquid will be evenly cooled throughout its body.

During the normal operation of a device of this type, the milk is poured into the cooling tank at intervals usually after each milking. When the first milk is placed in the cooled tank, it is quickly cooled by contact with the refrigerated walls of the tank. The desired milk temperature is maintained by a thermostat usually located near the bottom of the tank to prevent freezing of the milk due to variations in temperature in various parts of the tank. When a quantity of warm milk is added to the tank, some little time is passed before the warm milk contacts the area of the thermostat and raises the temperature thereof sufficiently to call for refrigeration. It is a purpose of the present invention to initiate the cooling cycle at a somewhat earlier time, thereby resulting in a faster cooling operation.

A feature of the present invention resides in the provision of a device for prematurely cycling the refrigeration circuit so as to materially reduce the normal time required for the warm milk loading to diffuse to the bottom of the milk storage tank and warm the thermostat bulb. This structure results in quicker milk cooling and lower blend temperatures.

A feature of the present invention resides in the provision of an apparatus of the type described which is safe to use. In the event the apparatus becomes inoperative, there is no chance of this device causing the stored milk to freeze. Failure of the system will only result in the normal functioning of the thermostat when the temperature of the blend of warm and cooled milk raises above a predetermnied minimum.

These and other objects and novel features of the present invention will be more clearly and fully set forth in the following specification and claims.

In the drawings forming a part of the specification:

Figure 1:
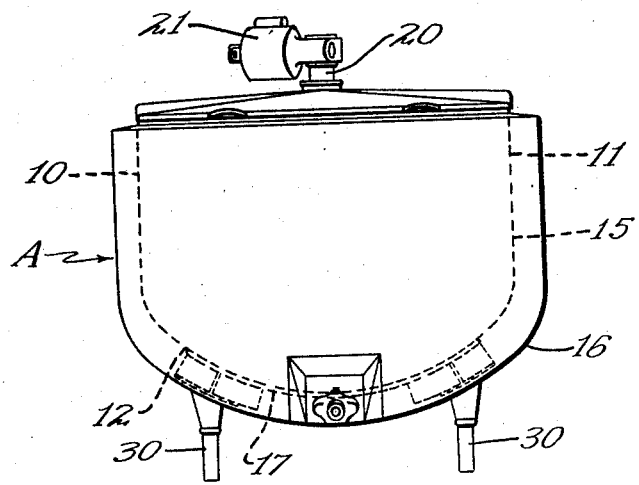
Figure 1 is an end view of a milk cooling tank showing the general arrangement of parts therein.
Figure 2:
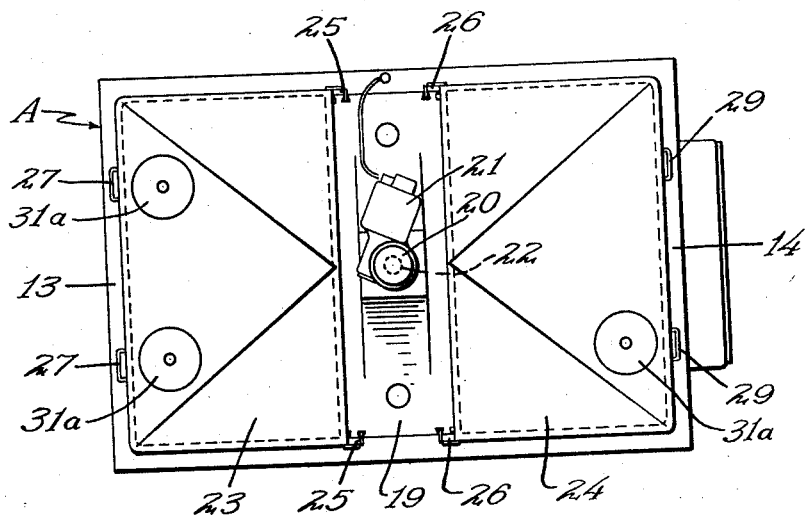
Figure 2 is a top planned view of the tank illustrated in Figure 1.

The type of milk cooler with which the system is employed is not of importance to the present invention and, accordingly, the one illustrated is for the purpose of description only. As is illustrated in Figures 1 and 2 of the drawings, the milk tank is indicated in general by the latter A and comprises a hollow receptacle which is generally rectangular in plan, having generally parallel side walls 10 and 11 and a rounded bottom 12. This trough-shaped structure extends between parallel ends 13 and 14. In the arrangement illustrated, the structure includes an inner shell of the shape described which is indicated in general by the numeral 15 and an outer shell of the same general shape which is illustrated in general by the numeral 16. The space between the inner shell or liner and the outer shell is filled with a suitable insulation. Refrigerant tubing which is illustrated only diagrammatically at 17 in Figure 1 of the drawings is in contact with the undersurface of the liner 11. This tubing 17 may comprise one or more elongated tubular conduits in heat transfer relation to the liner or serpentine refrigerant passages may be formed in a shell attached to the undersurface of the liner to provide a zig-zag flow of refrigerant in heat transfer relation with the undersurface of the liner.

In the particular form of construction illustrated, the tank is provided with a top panel 19 which bridges the center portion of the tank intermediate the ends 13 and 14 thereof. An agitator 20 is shown mounted upon this center panel 19, the agitator including an electric motor 21 which drives a vertical shaft 22 having an agitating means at its lower end. This agitating means is designed to extend into the tank near the bottom thereof and to circulate the milk in such a manner as to cause a constant flow of the milk over the refrigerated surface.

A pair of cover panels 23 and 24 are hingedly connected to the center panel 19 by hinges 25 and 26, respectively. Thus the covers 23 and 24 may be hinged upwardly for cleaning. Milk may be poured into the tank from either side of the center thereof through openings 31a of Figure 2. Cover handles 27 and 29 are provided on the cover panels to simplify the opening of the covers.

The tank is supported upon supporting legs such as 30. These legs are of proper height to support the tank at a level at which milk may be conveniently poured into the tank from either end.

Figure 3:
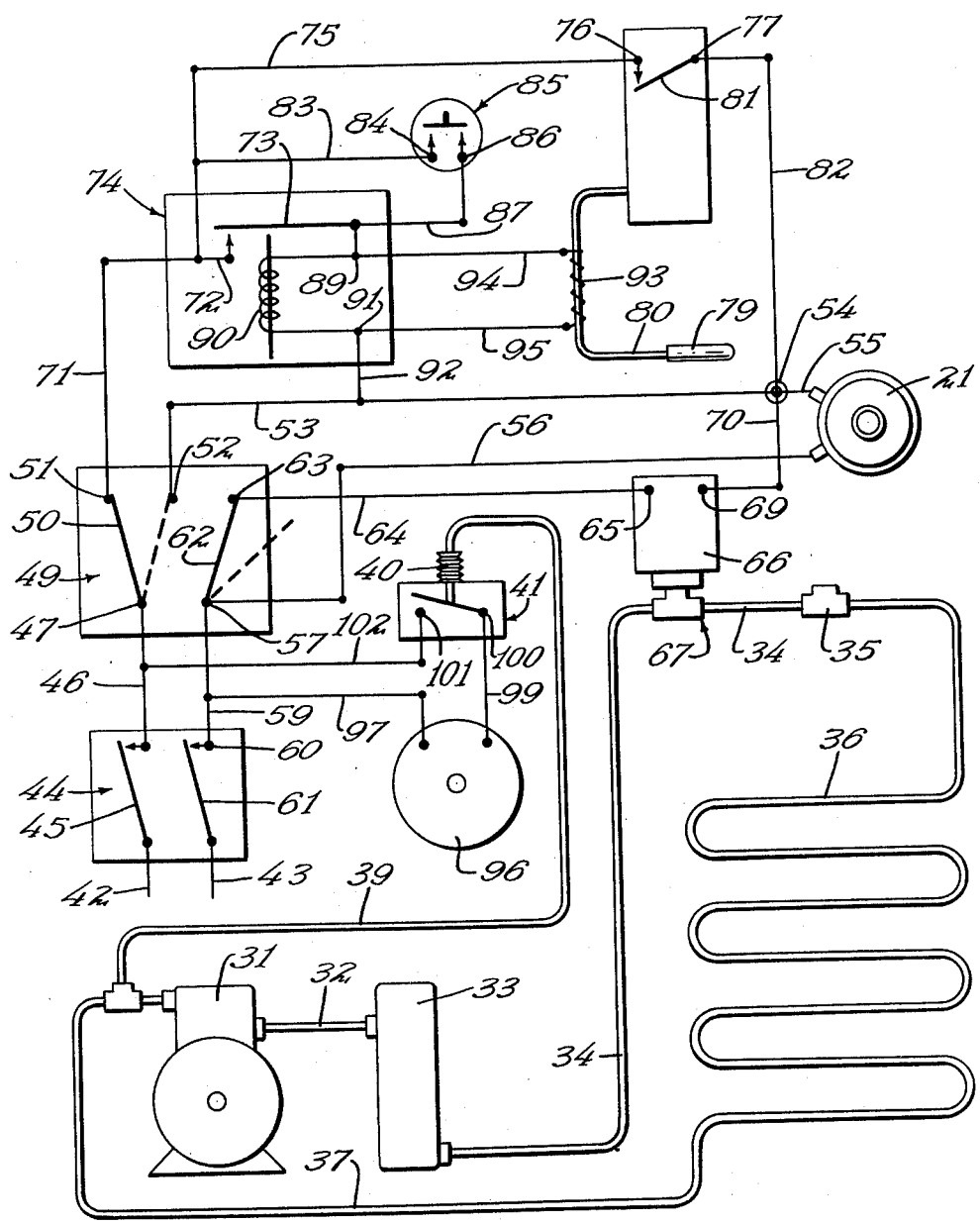
Figure 3 is a diagrammatic view showing the refrigeration system and wiring system of the apparatus.

With reference now to Figure 3 of the drawings, a typical refrigeration circuit is illustrated. While shown in simplified form, the circuit is shown as including a compressor 31 connected by a conduit 32 to a condenser 33. The condenser 33 is connected by a tubular connection 34 to an expansion valve or equivalent device 35. This expansion valve 35 is connected to the evaporator coil 36 which may be considered identical to the refrigerant tube 17, previously described. In the simple diagram illustrated in Figure 3, all of the refrigerant flows through evaporator coil 36.

The evaporator coil 36 is shown as connected by the suction line 37 to the compressor 31. The circuit also diagrammatically illustrates a branch line 39 leading to an expandable and contractible element 40 which controls a pressure switch indicated in general by the numeral 41. In other words, the switch 41 is subject to variations in pressure in the expandable and contractible element 40 and, accordingly, in the suction line of the system.

The wiring diagram is also indicated in Figure 3. Current is supplied through line wires 42 and 43 to a single throw double pole fused switch 44. The switch plate 45 of the switch 44 connects the line wire 42 with a conductor 46 leading to a terminal 47 of a rotary switch 49. The switch 49 includes a switch arm 50 which may be selectively connected either to a first terminal 51 or to a second terminal 52. The second terminal 52 is connected by a conductor 53 through a terminal 54 to a conductor 55 leading to one terminal of an agitator motor 21 which has been described.

The second terminal of the agitator motor 21 is connected by a conductor 56 to a terminal 57 which is permanently connected by a conductor 59 to the switch terminal 60 forming a part of the switch 44. The terminal 60 may be connected by the switch blade 61 to the line wire 43.

The terminal 57 is connected by a switch blade 62 forming a part of the rotary switch 49 to a terminal 63 of this switch. The terminal 63 is connected to a conductor 64 leading to one terminal 65 of a solenoid 66 which controls the operation of the solenoid coil valve 67. The other terminal 69 of the valve solenoid 66 is connected by a conductor 70 to the terminal 54 which has been described as being connected by the conductor 53, the switch arm 50, and the conductor 46 to the line wire 42.

The terminal 51 of the rotary switch 49 is connected by a conductor 71 to a fixed contact 72 which may engage the armature 73 of the relay 74 when this relay is energized. The conductor 71 is also connected by a conductor 75 to the fixed terminal 76 of a thermostat 77, which thermostat is actuated when the temperature bulb 79 raises in temperature sufficiently to call for additional refrigeration. The bulb 79 is connected by a capillary tube 80 to the thermostat to actuate the same in the well known manner. The arm 81 of the thermostat 77 is connected by a conductor 82 to the terminal 54 which has been described as being connected both to the solenoid coil 66 and to the agitator motor 21. Accordingly, when the thermostat contacts 81 and 76 are closed, a circuit is closed to the agitator motor to actuate the same and a second circuit is closed to the solenoid coil 66 when the switch arms 50 and 62 are in the positions shown in full lines in the drawing.

The conductor 75 is also connected by a conductor 83 to one terminal 84 of a push-button 85, the other terminal of this push-button switch, which is indicated at 86, being connected by a conductor 87 to the relay armature 73. One terminal 89 of the relay coil 90 of the relay 74 is connected to the conductor 87 while the other terminal 91 is connected by a conductor 92 to the previously described conductor 53. This conductor 53 leads from the terminal 52 of switch 49 to the terminal 54.

A heater coil 93 encircles the capillary tube 80 of the thermostat 77 and this heating coil is connected in parallel with the relay coil 90 by the conductors 94 and 95. Thus, when the relay coil 90 is energized, the heater coil 93 is also energized.

The operation of the apparatus is as follows:

The compressor motor 96 is connected by a conductor 97 to one line wire 59 and by a second conductor 99 to a fixed terminal 100 of the pressure switch 41. The other terminal 101 of the pressure switch is connected by a conductor 102 to the line wire 46. The line wires 46 and 59 are connected to the line wires 42 and 43 when the switch 44 is closed.

As a result of this arrangement, the compressor motor 96 continues to operate at all times unless the operating circuit is broken through the main switch 44 or through the pressure switch 41. The pressure switch 41 opens only when the pressure in the suction line of the refrigeration system drops below a predetermined level. This predetermined level can only be reached when the solenoid valve 67 is in closed position so that liquid refrigerant cannot circulate from the condenser 33 into the evaporator coil.

With the rotary switch 49 having its contact 50 and 62 in the position shown in full lines in the drawing, the refrigeration system will work automatically as controlled by the thermostat 77. When the temperature is lowered sufficiently so that the contacts 76 and 81 are broken, the circuit from the line wire 42 through conductors 46, switch blade 50, conductors 71 and 75 is broken and the solenoid coil 66 is de-energized. The circuit to the agitator motor 21 is also simultaneously de-energized. However, the circuit to the compressor motor 96 remains closed temporarily.

When the solenoid valve 67 is closed by de-energization of the coil 66, the refrigerant can no longer flow into the evaporator coil 36. However, as the compressor motor remains in operation, all of the liquid refrigerant is drawn from the evaporator tube and the pressure in the suction line is reduced to a point where the pressure switch 41 is opened. At this time the compressor motor stops operation until the thermostat again calls for added refrigeration.

When warm milk is added to the cold milk being stored in the milk cooler, the system described to this point would eventually cool all of the milk. However, when warm milk is added to the cooled milk, some time is required before the warm milk blends with the cooled milk sufficiently to raise the temperature of the thermostat bulb 79 sufficiently to actuate the thermostat 77. Accordingly, a means is provided for initiating this added cooling cycle.

When milk from a second milking is to be added to the cooled milk from a first milking, the operator manually operates the push-button switch 85. This action closes a circuit from line wire 42 through the switch arm 45, conductor 46, switch arm 50, conductor 71 and conductor 83 through the push-button switch contacts 84 and 86 to one terminal of the relay coil 90. The other relay coil terminal 91 is connected by conductors 92, 53, 70 and the solenoid coil 66 to the conductor 64 leading to the switch arm 62, the conductor 59, the switch arm 61 to the line wire 43. This momentary energization of the relay coil 90 causes the relay contact 72 and 73 to close which latches the relay in energized position.

As the heating element 93 is in parallel with the relay coil 90, the heating element is simultaneously actuated, thus heating the fluid within the capillary tube 80. This action causes the premature closing of the thermostat contact 76 and 81, closing the circuits previously described to the valve solenoid 66 and to the agitator motor 21. As soon as the valve 67 is opened, the liquid refrigerant may flow to the expansion valve 35 and expand into the evaporator coil 36, thus elevating the pressure in the suction line 37. As soon as the pressure in the suction line is elevated to some extent, the normally closed pressure switch 41 will close and the compressor motor will start into operation, forcing refrigerant through the evaporator coil and reducing the temperature of the stored milk.

As a result, in place of having to wait until the warm milk poured into the tank blends with the cooled milk sufficiently to start the refrigerant system into operation, the system may be automatically set into operation by merely pressing the pushbutton switch 85 momentarily. This operation continues and the relay coil 90 and the heating element 93 remain energized until the thermostat capillary tube 80 is heated sufficiently to cause the closing of the thermostat contacts 76 and 81.

As soon as the thermostatic switch 77 closes, a direct circuit is closed through the blade 50 of the rotary switch 49 and through the conductor 71 and 75, the thermostat contacts 76 and 81, and the conductor 82 to the terminal 54 which is connected to one terminal of the solenoid coil 66 and agitator motor 21, both of which are connected to the rotary switch terminal 57 when this switch is in the position illustrated in full lines. Accordingly, the current may flow to the solenoid valve 67 and the agitator motor 21 without passing through the added resistance of the relay coil 90 and heating element 93 and, accordingly, the current follows the path of least resistance and this relay coil is de-energized and the circuits to the relay coil and the heating element 93 are broken.

It will be seen that by the novel means described, the agitator as well as the refrigerant cycle may be started into operation considerably before these elements would normally be set into operation if the operator depended upon the blending of the warm and cooled milk to actuate the thermostat. When milk from the first milking is placed in the tank, it is quickly and effectively cooled.

At the start of each subsequent milking operation where added milk is to be added to the tank, the operator merely acuates the push-button switch 85 which starts the refrigerant cycle almost immediately, thus, resulting in a much more uniform milk temperature in the tank.

In some instances, it is desirable to agitate the milk independently of the system described. This may be accomplished by merely rotating the rotary switch 49 so that the switch arms 50 and 62 are in the dotted outline position illustrated. This closes a circuit from one line wire to the other through the agitator motor 21 while the remainder of the circuit remains open.

In accordance with the patent statutes, we have described the principles of construction and operation of our premature cycler for refrigeration load, and while we have endeavored to set forth the best embodiment thereof, we desire to have it understood that obvious changes may be made within the scope of the following claims without departing from the spirit of our invention.

We claim:

1. A premature cycler for refrigeration load comprising a refrigeration system including an evaporator, a compressor connected thereto to circulate refrigerant therethrough, and an electrically operated valve means for controlling the circulation of refrigerant through said evaporator, a thermostat associated with said electrically operated valve means for controlling the operation thereof, a first circuit including a current source, said valve, and said thermostat, and manually operable means for actuating said electrically operated means before said thermostat calls for operation thereof including a heating element in heat transfer relation to said thermostat, and a second operating circuit including a current source, said heating element, said electrically operated valve, and a manually operable switch.

2. A premature cycler for refrigeration load comprising a refrigeration system including an evaporator, a compressor connected thereto to circulate refrigerant therethrough, and an electrically operated means for controlling the circulation of refrigerant through said evaporator, a thermostat associated with said electrically operated valve means for controlling the operation thereof, and manually operable means for actuating said electrically operated valve means before said thermostat calls for operation thereof including a heating element in heat transfer relation to said thermostat, and means for manually initiating said heating element to cause premature actuation thereof, said last named means comprising a circuit including a current source, a latching relay coil, a manually operable switch and said heating element.

3. A premature cycler for refrigeration load in combination with a liquid storage tank designed to cool and store liquid, a refrigeration system including evporator coils in heat transfer relation with said tank, a means for circulating refrigerant through said evaporator coils, and an electrically operated valve means operable to control the flow of refrigerant through said coils, a means sensitive to variations of temperature of liquid within said tank, a circuit including a current source, said sensitive means, and said electrically operated valve means for actuating said electrically operated valve means to initiate flow of refrigerant upon an increase of temperature in said sensitive means, and additional means for operating said electrically operated valve means including a second circuit in parallel with said first circuit and including said current source, a manually operable control switch, a heating element in heat transfer relation to said sensitive means, and said electrically operated valve means.

4. A premature cycler for refrigeration load in combination with a liquid storage tank designed to cool and store liquid, a refrigeration system including evaporator coils in heat transfer relation with said tank, a means for circulating refrigerant through said evaporator coils, and an electrically operated valve means operable to control the flow of refrigerant through said coils, a means sensitive to variations of temperature of liquid within said tank, a circuit including a current source, said sensitive means, and said electrically operated means, said circuit being operable for actuating said electrically operated means to initiate flow of refrigerant upon an increase of temperature in said sensitive means, and additional means for operating said electrically operated means to initiate flow of refrigerant including a second circuit in parallel with said first circuit and including said power source, a control switch, a heating element in heat transfer relation to said sensitive means, and said electrically operated switch means, a latching relay including a relay coil in said second circuit, and latching relay contacts in parallel with said control switch for maintaining said second circuit closed.

5. The structure of claim 4 and in which said relay coil is in parallel with said heating element.

6. The structure of claim 4 and in which the closing of the first mentioned circuit acts to de-energize said latching relay coil.

7. The structure of claim 4 and including a means operable by variations of pressure in said refrigeration system for controlling said means for circulating refrigerant.

8. The structure of claim 4 and including an electrically actuated agitator in said first and second circuits.

9. In a premature cycler for refrigeration load, a refrigerating system including a condenser and an evaporator and means for withdrawing vaporized refrigerant from said evaporator and returning it to said condenser, a solenoid operated valve for controlling the flow of liquid refrigerant through said evaporator, a thermostatic switch, an electric circuit for energizing said solenoid, including a current source, said solenoid, and said thermostatic switch, a heating element in heat exchange relation to said temperature responsive control means, a second electric circuit including a current source, a manually operable switch, said heating element and said solenoid, and means in said last named circuit maintaining the last named circuit closed when said first named switch is open and opening said last named circuit when said first named switch is closed.

10. The structure described in claim 9 and in which said first named switch of said first circuit is connected in parallel with said manually operable switch, heating element and circuit maintaining means of said second circuit.

11. In a premature cycler for refrigeration load, a refrigerating system including a condenser and an evaporator and means for withdrawing vaporized refrigerant from said evaporator and returning it to said condenser, a solenoid operated valve for controlling the flow of liquid refrigerant through said evaporator, an electric circuit having a switch therein for energizing said solenoid, temperature responsive control means for actuating said switch, a heating element in heat exchange relation to said temperature responsive control means, a second electric circuit including a manually operable switch, said heating element, said solenoid, and a latching relay; said first named switch of said first circuit being connected in parallel with said latching relay of said second circuit.

12. The structure of claim 11 and in which said latching relay and said heating element are connected in parallel in said second circuit.

References Cited in the file of this patent

UNITED STATES PATENTS

| | | |
|---|---|---|
| 1,919,078 | Spreen | July 18, 1933 |
| 2,075,349 | Lawton | Mar. 30, 1937 |
| 2,355,894 | Ray | Aug. 15, 1944 |
| 2,524,813 | Lathrop | Oct. 10, 1950 |
| 2,534,455 | Koontz | Dec. 19, 1950 |